Patented Sept. 20, 1938

2,130,557

UNITED STATES PATENT OFFICE 2,130,557

PROCESS OF PREPARING A SOLUTION OF CALCIUM - REPRESSING ALKALI - METAL METAPHOSPHATE FROM WATER-INSOLUBLE ALKALI-METAL METAPHOSPHATES

Casimir J. Munter, Dormont, Pa., assignor to Hall Laboratories, Inc., Pittsburgh, Pa., a corporation of Pennsylvania No Drawing. Application March 12, 1936, Serial No. 68,442

7 Claims. (Cl. 23—107)

This invention relates to a process of preparing a solution of calcium-repressing alkali-metal metaphosphate from water-insoluble alkali-metal metaphosphates.

The patent to Ralph E. Hall, Reissue No. 19,719, reissued October 8, 1935, discloses the use of water-soluble alkali-metal metaphosphates, for example sodium hexametaphosphate, sometimes called "Graham's soluble metaphosphate", for water softening, washing, preventing deposits or dissolving deposits of alkaline earth metal compounds, and other uses. The sodium hexametaphosphate, in addition to being water-soluble, has the property of repressing calcium and magnesium without causing precipitation of these alkaline earth metals. The sodium hexametaphosphate sequesters calcium and magnesium in a but slightly ionized condition, so that the water is effectively softened and rendered suitable for washing or other purposes.

There are, however, certain alkali-metal metaphosphates which are not water soluble, and because of this fact are not available for the uses referred to in the above-mentioned patent. Among such water-insoluble metaphosphates may be mentioned Maddrell and Kurrol salts. Maddrell salt is generally believed at the present time to be a very highly polymerized sodium metaphosphate whose formula may be expressed as $(NaPO_3)_n$, in which the $n$ may be as high as 50. The term "Maddrell salt" takes its origin from Maddrell, who in 1847 published a paper in Liebig's Annalen describing the properties of the common insoluble sodium metaphosphate. Kurrol salt was first referred to in an article by Tammann (Journal Fuer Praktische Chemie, vol. 45, pg. 467, 1892). The most extensive treatment of Kurrol salts has been presented by Pascal (Bulletin de la Societe Chemique, vol. 35, pgs. 1124–1130, 1924).

I have found that Maddrell salt may be gotten into solution and converted at least partially into a sodium metaphosphate which has the property of repressing calcium and magnesium, by dissolving the Maddrell salt in a strong acid solution maintained at a temperature not substantially above room temperature. Thereafter, the acid solution is preferably neutralized so as to render the solution more suitable for certain uses, but the acid solution may in some cases be used as such without neutralizing it. When reference is made to "neutralizing" the acid solution, it is not necessarily meant that the acid solution is converted into a state in which it is neither acid nor alkaline. The acid solution may be "neutralized" and still remain acid, or more of a base may be added to the acid solution so as to make it truly neutral, or still more of a base may be added so as to make the solution akaline.

In carrying out the process, and referring specifically to Maddrell salt which is a highly polymerized sodium metaphosphate, the Maddrell salt is dissolved in a strong acid. For example, hydrochloric acid having a concentration of 7½ grams per litre and a pH value of approximately 0.9 will dissolve about 8 grams per litre of the water-insoluble Maddrell salt in 30 hours. In a more strongly acid solution having a concentration of about 25 grams hydrochloric acid per litre and a pH value of less than 0.5, approximately 80 grams of the water-insoluble Maddrell salt can be dissolved.

It is believed that in the presence of high hydrogen ion concentrations which are characteristic of strong acid solutions, the highly polymerized insoluble Maddrell salt is depolymerized and that during this depolymerization, a substantial amount of sodium hexametaphosphate is formed, the sodium hexametaphosphate having the property of sequestering calcium and magnesium when added to hard water.

Any strong acid having a low pH value may be used for dissolving the water-insoluble sodium metaphosphate. Thus, hydrochloric, nitric, sulphuric and chloracetic acids may be used. Where the solution is to be used in the presence of soap or alkali, or both, such for example as in washing processes, it is preferred to neutralize the strong acid solution to a pH of at least 7, as otherwise the soap or alkali intended for detergent purposes in the washing operation would be used in neutralizing the acid rather than being available for acting as a detergent.

In such cases, the strong acid solution is neutralized by adding thereto any suitable base, preferably an alkali-metal base such as sodium or potassium hydroxide, sodium or potassium carbonate. Other suitable bases are ammonium hydroxide and lithium carbonate.

When the highly acid solutions are neutralized to pH 8, an oily precipitate may appear if the metaphosphate concentration is high, but upon dilution of the solution this oily precipitate dissolves. It is believed that this precipitate contains sodium hexametaphosphate and that its apparent insolubility is due in part to the concentration of other sodium salts resulting from the neutralization and to incomplete depolymerization of the Maddrell salt, or to the depolymerization of the Maddrell salt to less soluble metaphosphates than hexametaphosphate. This belief is based upon the fact that sodium hexametaphosphate under certain conditions of concentration precipitates as an oil similar to the oily precipitate obtained upon neutralization of the Maddrell salt. The precipitates can be gotten into solution by sufficient dilution, and on the basis of the total metaphosphate present, the effectiveness of such solutions is from 25 to 50% as great as the effectiveness of solutions in which all of the metaphosphate is present as the hexametaphosphate.

If desired, instead of diluting the solution in order to dissolve the precipitate formed upon neutralizing the acid solution, the precipitate and solution may be used as such, because when added to water for softening the water or for washing purposes, the dilution will dissolve the precipitate.

Water-insoluble sodium or potassium metaphosphates, for example Kurrol salts, may be rendered soluble and converted into a form in which the solution has the property of repressing calcium and magnesium, in the same manner as described in connection with the treatment of the Maddrell salt.

The solutions prepared in accordance with the present invention may be used for the purposes for which the water-soluble alkali-metal metaphosphates referred to in the Hall Reissue Patent No. 19,719 are employed, the present invention providing a process for producing solutions of the calcium-repressing alkali-metal metaphosphates from water-insoluble alkali-metal metaphosphates.

I have described certain preferred procedures in carrying out my process. It is to be understood, however, that the invention may be otherwise practiced within the scope of the following claims.

I claim:

1. A process of preparing a solution of calcium-repressing alkali-metal metaphosphate from water-insoluble alkali-metal metaphosphates, which comprises dissolving the water-insoluble alkali-metal metaphosphate in a strong acid without heating.

2. A process of preparing a solution of calcium-repressing alkali-metal metaphosphate from water-insoluble alkali-metal metaphosphates, which comprises dissolving the water-insoluble alkali-metal metaphosphate in a strong acid without heating, and thereafter neutralizing the solution.

3. A process of preparing a solution of calcium-repressing alkali-metal metaphosphate from water-insoluble alkali-metal metaphosphates, which comprises dissolving the water-insoluble alkali-metal metaphosphate in a strong acid without heating, and thereafter neutralizing the solution with an alkali-metal base.

4. A process of preparing a solution of calcium-repressing sodium metaphosphate from water-insoluble sodium metaphosphates, which comprises dissolving the water-insoluble sodium metaphosphate in a strong acid without heating.

5. A process of preparing a solution of calcium-repressing sodium metaphosphate from Maddrell salt, which comprises dissolving the Maddrell salt in a strong acid without heating.

6. A process of preparing a solution of calcium-repressing alkali-metal metaphosphate from Kurrol salts, which comprises dissolving the Kurrol salt in a strong acid without heating.

7. A process of preparing a solution of calcium-repressing alkali-metal metaphosphate from water-insoluble alkali-metal metaphosphates which are substantially free from divalent metal phosphates, which comprises dissolving the water-insoluble alkali-metal metaphosphate in a strong acid without heating.

CASIMIR J. MUNTER.